3,125,432
HERBICIDAL METHOD EMPLOYING CYANO-
           PHENYL METHYL UREAS
Charles W. Todd, Thornbury Township, Delaware
  County, Pa., assignor to E. I. du Pont de Nemours
  and Company, Wilmington, Del., a corporation of
  Delaware
   No Drawing. Filed July 18, 1960, Ser. No. 43,330
               1 Claim. (Cl. 71—2.6)

This invention relates to a class of cyanophenyl methyl ureas and to compositions containing these compounds.

The cyanophenyl methyl ureas of the invention are represented by the formula (1) 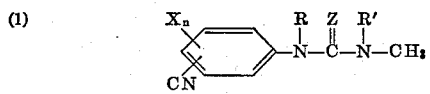

where X is hydrogen or chlorine; n is 1 or 2; Z is oxygen or sulfur; R is hydrogen or methyl; and R' is hydrogen or alkyl of less than 5 carbon atoms.

The ureas of this invention can be prepared by conventional methods, for example, by reaction of aliphatic and aromatic primary and secondary amines with an isocyanate isothiocyanate, carbamyl chloride, or thiocarbamyl chloride. The following equation illustrates one method with respect to the preparation of the cyanophenyl methyl ureas of this invention:

(2) 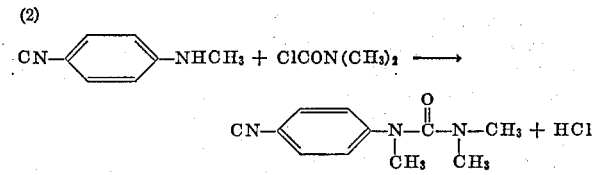

The above reaction is accomplished by bringing the amine in contact with one or the other of the reactants specified, usually in chemically equivalent amounts and, if necessary, heating. It is in many cases preferable to use an excess of the amine, for example, 10 to 20% molar excess.

Although not in general essential, inert liquid media, for example, dry benzene, dry toluene, dry anisole, and the like can for the most part be advantageously employed. It is desirable to use an acid acceptor, for example, a tertiary amine such as triethylamine, dimethylaniline, pyridine, and the like. Ordinarily, temperatures in the range of 0 to 100° C. or preferably 15 to 75° C. are satisfactorily employed for the above reactions.

Other methods which can be used in the preparation of the cyanophenylureas of this invention are illustrated by the following equations:

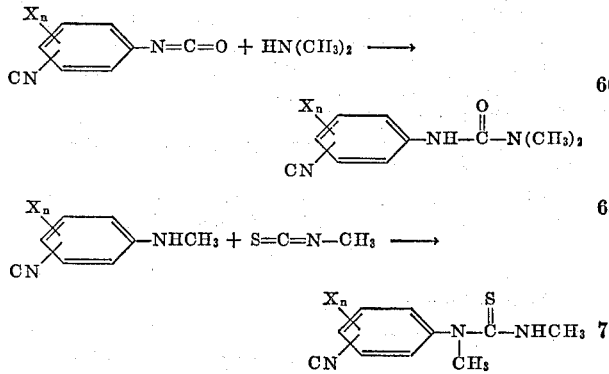

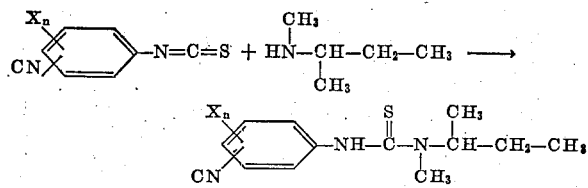

It has been found that the ureas of this invention, all of which contain a meta directing cyano group on the phenyl ring, possess outstanding herbicidal action. This is surprising, since in all of the commercial urea herbicides containing a substituted phenyl group, the substituent on the phenyl group is ortho-para directing. For example, monuron, that is 3-(p-chlorophenyl)-1,1-dimethylurea, contains a chlorophenyl group; and, as is well known, halogens are ortho-para directing with respect to a benzene nucleus.

To use these substituted ureas as herbicides, ordinarily they are formulated into herbicidal compositions by admixing one or more of the substituted ureas, in herbicidally effective amounts, with a conditioning agent of the kind used and referred to in the art as a pest control adjuvant or modifier in order to provide formulations adapted for ready and efficient application to soil or weeds (i.e., unwanted plants) using conventional applicator equipment.

Thus herbicidal compositions, or formulations, are prepared in the form of either powdered solids or liquids. The liquid compositions, whether solutions or dispersions of the active substituted urea in a liquid diluent, ordinarily contain as a conditioning agent a surface-active agent in amounts sufficient to render the liquid composition readily dispersible in water for application as an aqueous spray. The powdered solid herbicidal compositions preferably also contain a surface-active agent in an amount sufficient to impart water dispersibility to the powdered compositions, although the surface-active agent can be omitted if it is desired to apply the compositions by dusting rather than spraying. However, even though the surface-active agent be omitted the herbicidal composition will still contain, of course, a powdered solid carrier or diluent as a conditioning agent.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, Nos. 7–10 (1955).

Generally, the surface-active agent will not comprise more than about 5 to 15% by weight of the composition, and in certain compositions the percentage will be 1% or less. Usually the minimum lower concentration will be 0.1%.

Powdered or dust compositions of the invention whether or not also modified with a surface-active agent to make them water dispersible are prepared by admixing one or more of the active substituted ureas with finely divided solids, preferably, talcs, natural clays, pyrophyllite, diatomaceous earth, and flours such as walnut shell, wheat, redwood, soya bean, and cotton-seed flours. Other inert solid carriers which can be used to prepare the herbicidal formulations include magnesium and calcium carbonates, calcium phosphate, sulfur, lime, etc., either in powder or granular form. The percentage by weight of the essential active ingredients will vary according to the manner in which the composition is to be applied but, in general, will be 0.5 to 95% by weight of the herbicidal composition.

The active substituted ureas can be dissolved in organic solvents such as cyclohexanone, methyl ethyl ketone, cyclohexanol, furfural, acetone, isobutanol, ethanol, isopropylacetate, and the like, in the preparation of liquid compositions of the invention. Concentrated water-dispersible liquid compositions can be prepared by incorporating the ureas and surface-active agents in various organic liquids such as furfural, methanol, isopropanol, isobutanol, xylol, cresol, cyclohexanone, acetone, methyl ethyl ketone, kerosene, trichloroethylene, dimethylformamide, dimethylacetamide, alkylated naphthalenes, and the like. Such compositions are readily dispersible in water and provide excellent aqueous herbicidal sprays for field application. The proportion of surface-active dispersing agent to urea can be 0.1 to 100% by weight in the water-dispersible herbicidal compositions.

The herbicidal compositions of the invention can also have incorporated therein oils, fats or similar vehicles such as cottonseed oil, olive oil, lard, paraffin oil, hydrogenated vegetable oils, etc.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds, or alternatively, the application can be made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil. For some purposes, as in the treatment of ponds and lake bottoms and brush, it will be convenient to use a pellet form of the composition.

In another method of application for weed control, the ureas are incorporated with fertilizers to form either powdery or granular herbicidal compositions that can be used in the cultivation of agricultural crops.

The active ingredients are, of course, applied in amount sufficient to exert the desired herbicidal action. The amount of herbicidally active compounds present in the compositions as actually applied for destroying or preventing weeds will vary with the herbicidal activity of the active ingredients, the purpose for which the application is being made (i.e., whether for short term or long term control), the manner of application, the particular weeds for which control is sought, and like variables. Certain of the specific examples to follow will illustrate various kinds and amounts of application and the results obtained thereby. In general, the herbicidal compositions as applied in the form of a spray or a dust will contain from about 0.02% to 95% by weight of herbicidally active ingredient.

The solid and liquid compositions described and employed herein for application of the essential active herbicidal ingredient all have the common property of permitting application of the herbicidal compositions through suitable jets, nozzles, or spreaders adapted for the handling of granular materials onto the plants being treated and will, for convenience, be designated as "fluent carriers." The fluent carriers with which this invention is primarily concerned are non-solvent fluent carriers.

These compounds have utility as herbicides, both for weed control in cropland at relative low rates of 1 to 4 pounds per acre and for control of undesirable annual and perennial broadleaf and grass weeds growing on noncropland at rates of 20 to 40 pounds per acre. On certain hard-to-kill perennial species, higher rates can be usefully employed.

In cropland, although effective in pre-emergence application, they are particularly adapted to directed post-emergence control of such weeds as crabgrass, foxtail, millet, barnyard grass, Johnson grass, cheat, lamb's-quarters, pigweed, chickweed, and wild mustard growing in corn, sorghum, sugar cane and certain woody ornamentals. Some of the undesirable weeds on non-cropland that are controlled include quackgrass, Johnson grass, pigweed, lamb's-quarters, crabgrass, charlock, volunteer clovers, ragweed, mare's-tail and buttonweed.

In order that the invention may be better understood, the following examples are given in addition to the examples already given above. The numbers following the tabulated ingredients represent parts by weight of the ingredients in the respective compositions.

EXAMPLE 1

A solution of 118 parts by weight of p-aminobenzonitrile contained in 400 parts by weight of anisole is added dropwise to a stirring solution of 105 parts by weight of phosgene contained in 500 parts by weight of anisole. This mixture is heated at reflux temperature until HCl no longer evolves from the reaction, giving a clear solution of the corresponding isocyanate, p-cyanophenyl isocyanate. This solution is cooled to about 25° C. and 49 parts by weight (slight excess) of dimethylamine is passed into it with stirring. The entire mixture is heated until all the material is in solution. Upon cooling, essentially pure 3-(p-cyanophenyl)-1,1-dimethylurea crystallizes out of solution. This product, dried solvent-free, has a M.P. of 158°–160°.

*Analysis.*—Calcd. for $C_{10}H_{11}N_3O$: N, 22.22. Found: N, 21.92; 22.05.

EXAMPLE 2

A solution of 17.7 parts by weight of m-aminobenzonitrile dissolved in 30 parts of xylene is added dropwise with stirring to a solution of 17 parts by weight of phosgene in 170 parts of xylene. The mixture is heated to reflux temperature for two hours. Dry nitrogen is passed through the hot solution to remove the last traces of HCl gas. The solution is then cooled and dimethylamine gas is added until the mixture is saturated and basic to litmus. The precipitate is filtered and washed twice with n-pentane to obtain 25 parts by weight of crude product. This product is recrystallized from ethyl acetate to obtain 16 parts of 3-(m-cyanophenyl) 1,1-dimethylurea, which has a melting point of 159–160.5° C.

*Analysis.*—Calc'd. for $C_{10}H_{11}N_3O$: N, 22.22. Found: N, 21.48; 21.41.

EXAMPLE 3

A solution of 21.5 grams of 3-cyano-4-chloroaniline, prepared as described in J. Indian Chem. Soc. 10, 309 (1934), in a mixture of 500 milliliters of xylene and 75 milliliters of dioxane, is added rapidly, below the surface, to a solution of 21.0 grams of phosgene in 210 milliliters of xylene, while stirring. A heavy precipitate forms. The mixture is heated to reflux, with the solid dissolving at around 110° C., and nitrogen is introduced for five minutes to remove most of the hydrogen chloride found in the solution. The solution is then cooled, and an excess of dimethylamine gas is introduced. A white precipitate forms. After stirring for 30 minutes, the mixture is cooled in ice and filtered, and the solid is washed with water. The white crystalline product is 3-(3-cyano-4-chlorophenyl)-1,1-dimethylurea, having a net weight of 35 grams and a melting point of 152–7° C. Recrystallization from a water-ethanol mixture raises the melting point to 157–8° C.

*Analysis.*—Calc'd. for $C_{10}H_{10}ClN_3O$: C, 53.70; H, 4.51; Cl, 15.95; C, 53.60; H, 4.58. Found: Cl, 15.84.

EXAMPLES 4–11

By substituting molecular equivalent amounts of phosgene, thiophosgene, substituted aniline or alkyl amines shown in Table I for the phosgene, p-aminobenzonitrile and dimethylamine of Example 1, the following compounds of this invention are prepared:

*Table I*

| Example No. | Aniline Used | Alkyl Amine Used | X ‖ ClCCl Used | Product Obtained |
|---|---|---|---|---|
| 4 | o-amino-benzonitrile. | methylamine | thiophosgene | 3-(2-cyanophenyl)-1-methyl-2-thiourea. |
| 5 | 2-cyano-4-chloroaniline. | methyl ethyl amine. | phosgene | 3-(2-cyano-4-chloro-phenyl)-1-ethyl-1-methyl-urea. |
| 6 | m-amino-benzonitrile. | isopropyl amine | thiophosgene | 3-(3-cyanophenyl)-1-isopropyl-2-thiourea. |
| 7 | 2-chloro-3-cyano-aniline. | methyl isopropyl amine. | ___do___ | 3-(2-chloro-3-cyanophenyl)-1-methyl-1-isopropyl-2-thiourea. |
| 8 | 3,4-dichloro-5-cyano-aniline. | isobutyl amine | ___do___ | 5-(3,4-dichloro-5-cyano-phenyl)-1-isobutyl-2-thiourea. |
| 9 | 2-cyano-3,4-dichloroaniline. | dimethyl amine | phosgene | 5-(2-cyano-3,4-dichloro-phenyl)-1,1-dimethylurea. |
| 10 | 3-chloro-4-cyano-aniline. | methyl n-butyl amine. | thiophosgene | 5-(3-chloro-4-cyano-phenyl)-1-methyl-1-n-butyl-2-thiourea. |
| 11 | ___do___ | dimethyl amine | phosgene | 3-(3-chloro-4-cyano-phenyl)-1,1-dimethylurea. |

EXAMPLE 12

A total of 57 parts by weight of methyl isocyanate contained in 400 parts by weight of toluene is stirred and diluted gradually with 146 parts by weight of N-methyl-p-cyanoaniline contained in 200 parts by weight of toluene. The reaction is heated to reflux to effect solution. Upon cooling this filtrate, essentially pure 3-(p-cyanophenyl)-1,3-dimethylurea crystallizes out of solution.

EXAMPLES 13–16

By substituting molecular equivalent amounts of methyl cyanate or methyl isothiocyanate and the substituted anilines as described in the following Table II for methyl isocyanate and N-methyl-p-cyanoaniline of Example 12, the compounds shown in Table II are similarly prepared.

*Table II*

| Example No. | Substituted Aniline Used | Isocyanate Used | Product Formed |
|---|---|---|---|
| 13 | 3-cyano-4-chloro-N-methylaniline. | methyl isocyanate. | 5-(3-cyano-4-chloro-phenyl)-1,3-dimethylurea. |
| 14 | 3-chloro-4-cyano-N-methylaniline. | ___do___ | 5-(3-chloro-4-cyano-phenyl)-1,3-dimethylurea. |
| 15 | 3-cyano-N-methylaniline. | methylisothiocyanate. | 3-(3-cyanophenyl)-1,3-dimethyl-2-thiourea. |
| 16 | 2-cyano-3,4-dichloro-N-methylaniline. | ___do___ | 5-(2-cyano-3,4-dichloro-phenyl)-1,3-dimethyl-2-thiourea. |

EXAMPLE 17

A mixture of 79 parts by weight of pyridine and 107 parts by weight of dimethyl carbamyl chloride is heated for 0.5 hour at 60° C. This mixture is cooled to 25° C. and gradually (while stirring) diluted with 182.5 parts by weight of N-methyl-2-chloro-4-cyanoaniline. The reaction temperature is allowed to rise to 70–80° C. and maintained at this temperature for an additional two hours after the addition has been completed. After cooling the reaction, sufficient water is added to precipitate essentially pure 3-(2-chloro-4-cyanophenyl)-1,1-3-trimethylurea out of solution.

EXAMPLES 18–25

By substituting molecular equivalent amounts of N,N-dialkyl carbamyl chlorides and substituted anilines listed in Table III for dimethyl carbamyl chloride and N-methyl-2-chloro-4-cyanoaniline in Example 17, the compounds of this invention of Table III are similarly prepared.

*Table III*

| Example No. | Substituted Aniline Used | Carbamyl Chloride Used | Product Obtained |
|---|---|---|---|
| 18 | N-methyl-2,4-dichloro-5-cyanoaniline. | methyl n-propyl carbamyl chloride. | 3-(2,4-dichloro-5-cyanophenyl)-1,3-dimethyl-1-propylurea. |
| 19 | N-methyl-m-cyanoaniline. | dimethyl carbamyl chloride. | 3-(3-cyanophenyl)-3,1,1-trimethylurea. |
| 20 | N-methyl-3,4-dichloro-5-cyanoaniline. | dimethyl carbamyl chloride. | 3-(3,4-dichloro-5-cyanophenyl)-3,1,1-trimethylurea. |
| 21 | N-methyl-p-cyanoaniline. | N-methyl propyl thiocarbamyl chloride. | 3-(4-cyanophenyl)-1,3-dimethyl 1-propyl-2-thiourea. |
| 22 | N-methyl-2-chloro-4-cyanoaniline. | dimethyl thiocarbamyl chloride. | 3-(2,chloro-4-cyanophenyl)-3,1,1-trimethyl-2-thiourea. |
| 23 | N-methyl-m-cyanoaniline. | dimethyl carbamyl chloride. | 3-(3-cyanophenyl)-3,1,1-trimethylurea. |
| 24 | N-methyl-2-cyano-5-chloroaniline. | dimethyl carbamyl chloride. | 5-(2-cyano-5-chlorophenyl)-3,1,1-trimethylurea. |
| 25 | N-methyl-2-chloro-3-cyanoaniline. | methyl n-butyl thiocarbamyl chloride. | 3-(2-chloro-3-cyanophenyl) 1,3-dimethyl-1-n-butyl-2-thiourea. |

EXAMPLE 26

*Water-dispersible powders.*—The following powdered compositions are adapted for dispersing in water for application as a spray for the destruction and prevention of weeds. They are made by intimately mixing the listed ingredients using conventional mixing or blending equipment and then grinding the mixture to give powders having an average particle size less than 50 microns.

A

| | |
|---|---|
| 3-(p-cyanophenyl)-1,1-dimethylurea | 75 |
| Fuller's earth | 23.75 |
| Sodium lauryl sulfate, 50% (wetting agent) | 1 |
| Methyl cellulose, 15 cps. (dispersing agent) | .25 |

B

| | |
|---|---|
| 3-(3-cyano-4-chlorophenyl)-1,1-dimethylurea | 75 |
| Polyethylene oxide ester of mixed resin and fatty acids, concreted with urea | 3 |
| Methyl cellulose, 15 cps. | 0.2 |
| Disodium phosphate | 2 |
| Attapulgite clay | 19.75 |

C

| | |
|---|---|
| 3-(3,4-dichloro-5-cyanophenyl)-1,1-dimethylurea | 50 |
| Oleyl ester of sodium isothionate | 1 |
| Sodium lignosulfonate | 1 |
| Disodium phosphate | 2 |
| China clay (kaolin) | 46 |

D

| | |
|---|---|
| 3-(o-cyanophenyl)-1-methyl-2-thiourea | 80 |
| Sodium salt of alkylated naphthalene sulfonic acid | 1 |
| Methyl cellulose, 15 cps. | 0.25 |
| Disodium phosphate | 2 |
| Attapulgite clay | 16.75 |

E

| | |
|---|---|
| 3 - (m - cyanophenyl)1 - 1 - methyl - 1 - propyl-2-thiourea | 80 |
| Sodium salt of alkylated naphthalene sulfonic acid | 1 |
| Methyl cellulose, 15 cps. | 0.25 |
| Disodium phosphate | 2 |
| Attapulgite clay | 16.75 |

The above formulations are extended with 250 gallons of water and applied at the rate of 35 pounds of the active ingredient per acre with a truck-mounted pressure sprayer to a heavy infestation of annual and perennial broadleaf and grass species. Excellent kill of vegetation is evident.

F

The formulation described in B above is applied at the rate of 4 pounds (active ingredient) in 40 gallons of water for the directed post-emergence control of manual weeds growing in ornamentals (privet). Excellent control of crabgrass, foxtail, pigweed and mustard is obtained without adverse effects on the privet.

EXAMPLE 27

*Oil-water dispersible powder.*—The following powdered compositions are adapted for use in the preparation of a spray composition using either an oil, water, or a combination of oil and water as the liquid diluent. The powders are made by mixing and grinding as in the case of the powder of Example 1.

A

| | |
|---|---|
| 3-(4-chloro-3-cyanophenyl)-1-methylurea | 60 |
| Polyethylene oxide ester of mixed fatty and resin acids | 10 |
| Disodium phosphate | 2 |
| Attapulgite clay | 28 |

B

| | |
|---|---|
| 3-(2-cyano-5-chlorophenyl)-1,1-dimethylurea | 65 |
| Blended polyalcohol carboxylic esters and oil-soluble sulfonates | 5 |
| Disodium phosphate | 2 |
| Fuller's earth | 28 |

C

| | |
|---|---|
| 3-(p-cyanophenyl)-1-methylurea | 65 |
| Polyethylene oxide esters of mixed fatty and resin acids | 5 |
| Fuller's earth | 30 |

D

| | |
|---|---|
| 3 - (2 - chloro - 4 - cyanophenyl)-1-n-butyl 1-methylurea | 60 |
| Blended polyalcohol carboxylic esters and oil-soluble sulfonates | 15 |
| Fine silica | 5 |
| Attapulgite clay | 20 |

The above-listed compositions are diluted with 200 gallons of diesel oil and applied at the rate of 20 pounds of the active ingredient per acre from a railroad spray car. Excellent control of both annual and perennial weed species (including quackgrass, Bermuda grass, ragweed, pigweed, crabgrass and chickweed) is obtained.

EXAMPLE 28

*Water-dispersible liquid composition.*—The following compositions are in a liquid form adapted for addition to water to give aqueous dispersions for application as sprays. The urea herbicides are generally quite insoluble in most oils. Therefore, the liquid compositions ordinarily are not complete solutions but rather are dispersions of solid in an oil. The liquid or fluid compositions shown are prepared by thoroughly mixing and dispersing the active compounds and conditioning agents in the organic liquid diluents.

A

| | |
|---|---|
| 3-(4-cyanophenyl)-1,1,3-trimethylurea | 30 |
| Xylene | 63 |
| Blend of polyalcohol carboxylic esters and oil-soluble sulfonates | 7 |

B

| | |
|---|---|
| 3 - (2,3-dichloro-4-cyanophenyl)-1,1-dimethyl-2-thiourea | 40 |
| Straight-chain hydrocarbon | 55 |
| Polyethylene oxide esters of mixed fatty and resin acids | 5 |

C

| | |
|---|---|
| 3 - (3,4 - dichloro-5-cyanophenyl)-1,3-dimethyl-1-isopropyl-2-thiourea | 30 |
| Sulfonated petroleum oil (oil-soluble) | 10 |
| Kerosene (aliphatic hydrocarbons) | 60 |

These compositions are extended with 250 gallons of water and applied at the rate of 20 pounds of the active ingredient per acre in lumber yards with a specially-adapted hand pressure sprayer. Excellent control of quack grass, crabgrass, cheat, pigweed and lamb's-quarters, is obtained.

D

| | |
|---|---|
| 3-(3-cyano-4-chlorophenyl)-1,1-dimethylurea | 40 |
| Straight chain hydrocarbon | 55 |
| Polyethylene oxide esters of mixed fatty and resin acids | 5 |

This composition is extended with 35 gallons of water and applied at the rate of 3 pounds (active ingredient) per acre as a directed post-emergency spray to emerged young weeds growing in corn. Excellent control of crabgrass, foxtail and pigweed is obtained without visible injury to the corn.

EXAMPLE 29

*Granular composition.*—The following compositions are adapted for application by means of fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---|
| 3 - (2-,4-dichloro-5-cyanophenyl)-1,3-dimethyl-1-sec. butylurea | 5 |
| Methyl cellulose | 1 |
| Disodium phosphate | 1 |
| Sodium sulfate (anhydrous) | 10 |
| Pelleting clay | 83 |

B

| | |
|---|---|
| 3-(m-cyanophenyl)-1,1-dimethylurea | 8 |
| Portland cement | 40 |
| Low viscosity polyvinyl alcohol | 1 |
| Attaclay | 51 |

| | |
|---|---|
| 3 - (p - cyanophenyl) - 1,3-dimethyl-1-propyl-2-thiourea | 10 |
| Attaclay | 67 |
| Bentonite | 20 |
| Sodium lignosulfonate | 3 |

These granular compositions are applied at the rate of 35 pounds of the active ingredient per acre by means of a fertilizer spreader to control weeds on forest fire lanes or by hand for control of undesirable vegetation around highway signs and fence posts. Outstanding control of a mixed population of annual and perennial broadleaf and grass species is obtained.

This application is a continuation-in-part of my copending application Serial No. 666,757, filed June 19, 1957 (now abandoned), which in turn is a continuation-in-part of application Serial No. 412,045, filed February 23, 1954 (now abandoned), which in turn is a continuation-in-part of application Serial No. 186,118, filed September 21, 1950 (now abandoned).

I claim:

The method comprising applying to an area to be protected from undesired vegetation, in an amount sufficient to exert herbicidal action, a cyanophenyl methyl substituted urea of formula

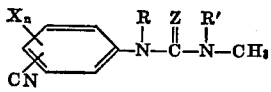

where X is chlorine, $n$ is 0–2 inclusive; Z is selected from the group consisting of oxygen and sulfur; R is selected from the group consisting of hydrogen and methyl; and R' is selected from the group consisting of hydrogen and alkyl of 1–4 carbon atoms inclusive.

References Cited in the file of this patent

UNITED STATES PATENTS

| | | |
|---|---|---|
| 2,538,008 | Keyes et al. | Jan. 16, 1951 |
| 2,655,444 | Todd | Oct. 13, 1953 |
| 2,655,534 | Searle | Oct. 13, 1953 |
| 2,780,535 | Snyder | Feb. 5, 1957 |
| 2,787,574 | Oneill et al. | Apr. 2, 1957 |
| 2,876,088 | Hill et al. | Mar. 3, 1959 |
| 2,897,229 | Stuehmer et al. | July 28, 1959 |
| 3,031,292 | Todd | Apr. 24, 1962 |

OTHER REFERENCES

Dyson et al.: J. Chem. Soc., 1927, pp. 442–443.

Jacini: Gazz. Chim. Ital., 77 (1947), p. 310.

Doub et al.: Journal of American Chemical Society, 1958, vol. 80, pp. 2205–2216.